May 4, 1965  C. A. HOWELL  3,181,853
MOTOR VEHICLE AIR SUSPENSION
Original Filed Feb. 11, 1957  2 Sheets-Sheet 1

C. A. HOWELL
INVENTOR.

BY

ATTORNEYS

May 4, 1965

C. A. HOWELL 3,181,853

MOTOR VEHICLE AIR SUSPENSION

Original Filed Feb. 11, 1957

C.A.HOWELL
INVENTOR.

BY

ATTORNEYS

United States Patent Office
3,181,853
Patented May 4, 1965

3,181,853
MOTOR VEHICLE AIR SUSPENSION
Carl A. Howell, Livonia, Mich., assignor to Ford Motor Company, Dearborn, Mich., a corporation of Delaware
Continuation of application Ser. No. 96,853, Mar. 20, 1961, which is a continuation of application Ser. No. 703,475, Dec. 13, 1957, which in turn is a continuation of application Ser. No. 639,289, Feb. 11, 1957. This application July 25, 1963, Ser. No. 298,003
11 Claims. (Cl. 267—15)

This application is a continuation of the copending application of Carl A. Howell for Motor Vehicle Air Suspension, Serial No. 96,853, filed March 20, 1961 (now abandoned), which, in turn, was a continuation of Serial No. 703,475, filed December 13, 1957 (now abandoned). That application was a continuation of Serial No. 639,-289, filed February 11, 1957 (now abandoned).

This invention relates generally to a motor vehicle air suspension and particularly to a leveling system for such a suspension.

In an embodiment of the present invention, a leveling valve is mounted within an air spring of a vehicle suspension and is provided with an actuating shaft extending through the wall of the air spring and operatively connected to a portion of the wheel suspension movable relative to the vehicle frame. The valve housing is formed with inlet and outlet passageways opening directly into the air spring and has connections exteriorly of the air spring with a pressure source and with exhaust. The actuating shaft of the valve is connected to a valve actuating member also located within the air spring and arranged to unseat spring urged valve members normally closing the inlet and outlet passageways so that the leveling system will be responsive to variations in vehicle loading. The valve housing is provided with a chamber containing a viscous fluid and with a vane attached to and oscillatable with the actuating shaft, the vane having a smaller area than the cross-sectional area of the chamber to provide a restricted opening between the vane and the chamber to dampen the movement of the actuating shaft and to provide a time delay preventing valve actuation due to temporary changes in the relationship between the vehicle frame and the wheels due to road irregularities.

Other objects and advantages of this invention will be made more apparent as this description proceeds, particularly in connection with the accompanying drawings, in which.

Figure 4:
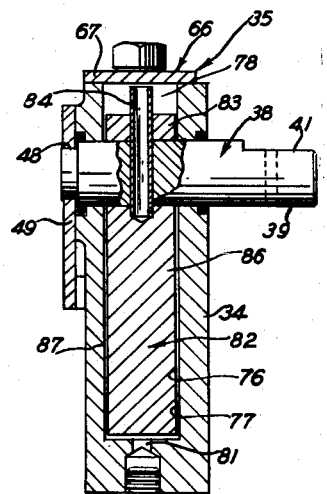
Figure 5:
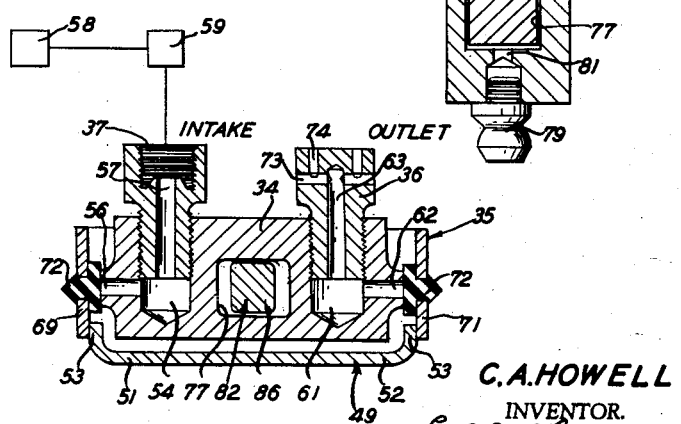
Figure 3:
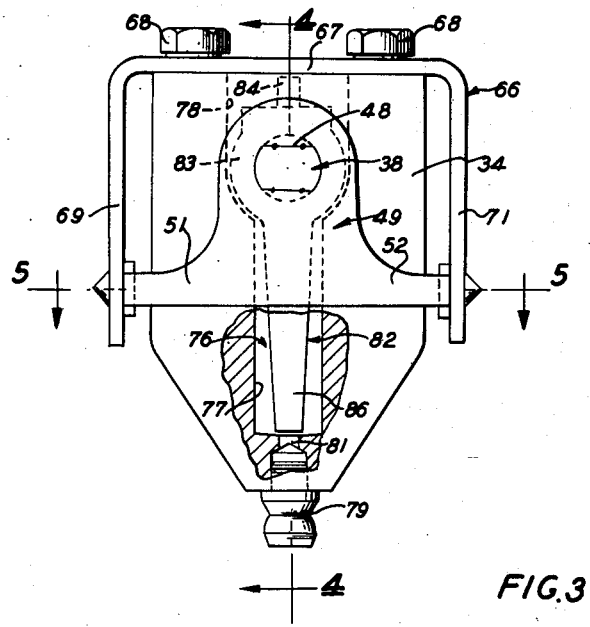
FIGURE 3 is an enlarged elevational view, partly broken away and in section, of the valve shown in FIGURE 1.
Figure 6:
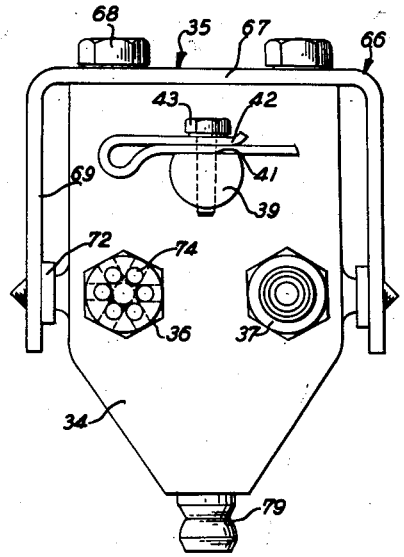

FIGURES 4 and 5 are cross-sectional views taken on the lines 4—4 and 5—5 of FIGURE 3;

FIGURE 6 is an elevational view of the side of the valve opposite to that shown in FIGURE 3.

Figure 1:
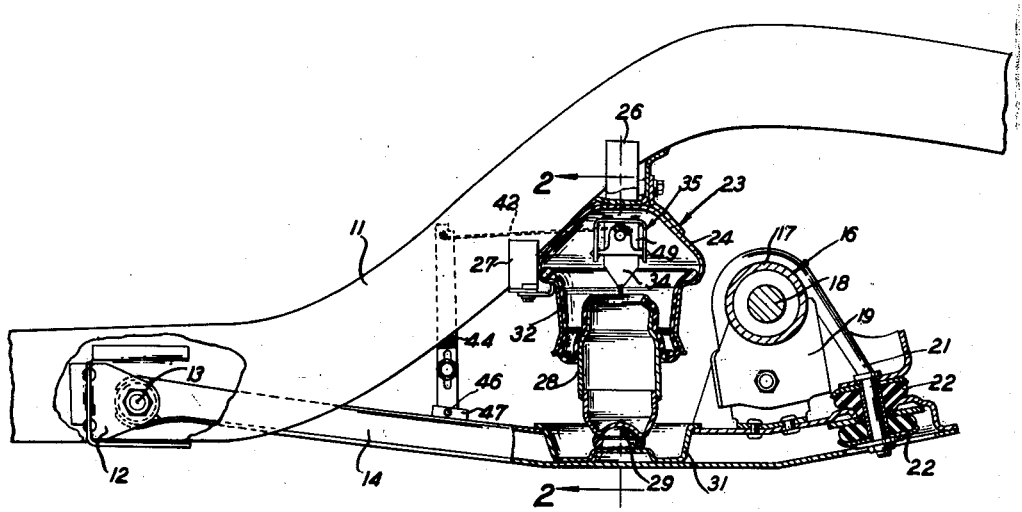
FIGURE 1 is a side elevational view, partly broken away and in section, of a motor vehicle wheel suspension incorporating the present invention.

Referring now to the drawings and particularly to FIGURE 1, the reference character 11 indicates the rearward portion of a side frame rail of a motor vehicle frame. A frame bracket 12 is mounted upon the inner side of the frame rail 11 and provides a pivotal connection 13 for the forward end of a trailing type suspension arm 14.

At its rearward end, the trailing suspension arm 14 is connected to the rear axle 16. The axle includes an axle tube 17 and an axle shaft 18 with the tube being supported upon a mounting bracket 19 secured to the suspension arm by means of a U-bolt 21. Rubber pucks 22 are utilized to insulate the axle from the suspension arm.

It will be understood that a similar construction is utilized at each side of the vehicle to form a complete suspension for the rear axle 16 and the rear road wheels (not shown) which are driven by the axle shafts 18.

An air spring 23 forms the spring medium for each suspension arm 14. The air spring includes an upper housing 24 secured to the side frame rail by means of brackets 26 and 27. The upper housing 24 is hollow and is open at its lower end to receive a hollow pedestal 28 supported at its lower end upon a ball joint 29 carried by a bracket 31 mounted upon the suspension arm. A rubber diaphragm 32 interconnects the upper housing 24 and the pedestal 28 of the air spring to form an enclosed airtight connection therebetween which accommodates relative movement between the two.

Figure 2:
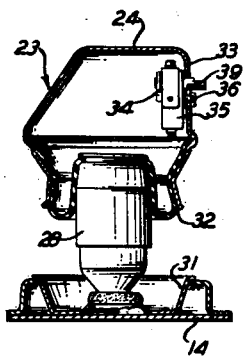
FIGURE 2 is a transverse cross-sectional view taken on the line 2—2 of FIGURE 1.

As best seen in FIGURE 2, the inner side wall 33 of the upper housing 24 is flat and supports the valve housing 34 of the leveling valve 35. The valve housing is generally rectangular and has opposite flat sides with one side positioned adjacent the side wall 33 of the air spring and secured thereto by bolts 36 and 37.

An actuating shaft 38 extends through the valve housing 34 and has a portion 39 projecting through an aperture in the air spring side wall 33. As best seen in FIGURES 1 and 6, the projecting portion 39 of the actuating shaft has a flat portion 41 secured to one end of a flexible actuating arm 42 by means of a bolt 43. The opposite end of the flexible actuating arm 42 is connected to the upper end of an adjustable link 44, the lower end of which is pivotally connected at 46 to a bracket 47 mounted on the trailing arm 14.

The inner end of the actuating shaft 38 extends through the valve housing 34 and has a flat portion 48 supporting a valve actuating member 49 in the form of a flat plate having oppositely extending arm portions 51 and 52. As shown in FIGURE 5, the arm portions 51 and 52 have terminal end portions 53 bent at right angles and overlapping the adjacent end walls of the valve housing.

Still referring to FIGURE 5, the valve housing 34 is formed with an inlet passageway 54 connected to an inlet port 56 in one end wall of the valve housing and also communicating with a passageway 57 in the bolt 37. The latter is connected to a source of fluid pressure such as a pump 58 and reservoir 59.

The valve housing 34 also has an outlet passageway 61 connected to an outlet port 62 in the opposite end wall of the valve housing, and also communicating with a passageway 63 in the bolt 36. The passageway 63 opens to atmosphere exteriorly of the air spring.

A U-shaped valve member 66 straddles the valve housing 34 and has its base 67 connected to the upper wall of the housing by means of bolts 68. The opposite leg portions 69 and 71 extend along the opposite end walls of the valve housing and overlap the outlet and inlet ports 62 and 56, respectively. The lower extremities of the leg portions are apertured to receive rubber valve seats 72 engaging the inlet and outlet ports and normally closing such ports.

Referring now to FIGURES 1, 3 and 5, it will be seen that an added load upon the vehicle frame will compress the air spring 23 and lower the frame rail 11, resulting, through the link 44 and arm 42, in a clockwise rotation of the valve actuating shaft 38. This clockwise rotation of the actuating shaft effects a corresponding rotation of the valve actuating plate 49 and causes the arm 51 of the plate to engage the flexible leg 69 of the valve member 66 and to move it to the left, lifting the valve seat 72 carried thereby from the inlet port 56 and admitting air into the air spring 23 from the reservoir 59 to raise the vehicle to its normal riding height.

If the load on the vehicle decreases, the actuating shaft 38 is rotated in a counterclockwise direction and the arm 52 of the valve actuating plate 49 will lift the valve seat 72 carried by the resilient leg 71 of the valve member 66 away from the outlet port 62 to permit air to be exhausted from the air spring to lower the vehicle to its normal riding height.

It will be noted from FIGURES 5 and 6 that the outlet fitting 36 is formed with a plurality of radial ports 73 and axial ports 74 communicating with the central passageway 63. The flow of exhaust air is thus broken up and muffled while at the same time the flow area is increased.

As best shown in FIGURES 3, 4 and 5, the valve housing 34 is formed with an elongated generally vertical fluid chamber 76 having a lower generally rectangular portion 77 and an upper enlarged portion 78. A fitting 79 closes a passageway 81 and enables fluid to be introduced within the chamber, and the upper end of the chamber is closed by the base 67 of the valve member 68. A vane 82 is disposed within the fluid chamber 76 and has a hub portion 83 secured to the actuating shaft 38 by means of a pin 84. The lower portion 86 of the vane 82 is tapered in side elevation and has a cross-sectional area, as seen in FIGURE 4, somewhat less than the cross-sectional area of the lower portion 77 of the chamber so as to provide a restricted clearance space 87 around the periphery of the vane.

The chamber 76 is filled with a low temperature variation fluid, and it will be apparent that oscillation of the vane within the fluid chamber is retarded by the movement of the fluid through the restricted opening 87 from one side of the vane to the other. Consequently, during short duration changes in the relationship between the vehicle frame and the road wheel, such as occur when the road wheel encounters road irregularities, the resulting vertical movement of the link 44 of FIGURE 1 is not translated into rotation of the valve actuating shaft 38 and operation of the inlet and outlet valves since the vane 82 dampens and resists this action. Instead, the movement is absorbed within the flexible arm 42 and, consequently, a time delay feature is provided which prevents unwanted correction in the riding height of the air spring 23 due to road irregularities and other temporary changes in the relationship between the vehicle frame and the road wheel. The leveling valve, however, accommodates permanent changes in the vehicle loading since sufficient time is available to move the vane 82 within the fluid chamber and to open the corresponding inlet or outlet port as the case may be.

It will be understood that the invention is not to be limited to the exact construction shown and described, but that various changes and modifications may be made without departing from the spirit and scope of the invention, as defined in the appended claims.

What is claimed is:

1. In a motor vehicle having a chassis member resiliently supported upon a road wheel member by means of an air spring, a source of air under pressure for said air spring, a leveling valve assembly including a valve housing mounted within the interior of said air spring, a port in said valve housing opening directly into the interior of said air spring, passage means connected to said port and extending exteriorly of said air spring, spring biased valve means associated with said valve housing normally closing said port, and actuating means for opening said spring biased valve means extending through a wall of said air spring and operatively connected exteriorly of said air spring to one of said members to be responsive to relative movement between said road wheel and said chassis.

2. In a motor vehicle having a chassis member resiliently supported upon a road wheel member by means of an air spring, a source of air under pressure for said air spring, a leveling valve assembly including a valve housing mounted within the interior of said air spring, a port in said valve housing opening directly into the interior of said air spring, a spring biased valve normally closing said port, an actuating shaft journaled in said housing and extending through a wall of said air spring and operatively connected exteriorly of said air spring to one of said members to be responsive to relative movement between said road wheel and said chassis, and means on said actuating shaft engageable with said valve to unseat the latter.

3. In a motor vehicle having a chassis member resiliently supported upon a road wheel member by means of an air spring, a source of air under pressure for said air spring, a leveling valve assembly including a valve housing mounted within the interior of said air spring, a pair of ports in said valve housing opening directly into the interior of said air spring, passage means connecting one of said ports with said air source and the other of said ports with exhaust, spring biased valve means controlling each of said ports, and actuating means for said valve means extending through a wall of said air spring and operatively connected exteriorly of said air spring to one of said members to be responsive to relative movement between said road wheel and said chassis to admit air into or exhaust air from said air spring in response to variations in the relationship between said chassis and said road wheel.

4. In a motor vehicle having a chassis member resiliently supported upon a road wheel member by means of an air spring, a source of air under pressure for said air spring, a leveling valve assembly having a valve housing mounted within the interior of said air spring, an actuating shaft for said housing extending through a side wall of said air spring, means connecting the extending portion of said actuating shaft with one of said members to be responsive to relative movement between said chassis and said road wheel, said valve housing having an inlet port opening directly into the interior of said air spring, means connecting said inlet port to said pressure source, said valve housing having an outlet port opening directly into the interior of said air spring, means connecting said outlet port to exhaust, a spring urged valve member normally closing each of said ports, and an actuating member mounted upon said actuating shaft for movement therewith, said actuating member having portions engageable with said valve members to open one of said ports upon rotation of said actuating shaft in one direction and the other of said ports upon rotation of said actuating shaft in the opposite direction.

5. The structure defined by claim 4 which is further characterized in that said valve members are mounted exteriorly of said valve housing but interiorly of said air spring and overlie said inlet and outlet ports, said actuating member also being mounted exteriorly of said valve housing but interiorly of said air spring for selective engagement with said spring urged valve members.

6. The structure defined by claim 4 which is further characterized in that said valve housing has one flat side secured to the inner side of one wall of said air spring, said inlet and outlet ports being located on the opposite end walls of said housing, said valve members overlying said inlet and outlet ports, and said actuating member being located on the side of said valve housing opposite said wall of the air spring and having portions selectively engageable with said valve members.

7. In a motor vehicle having a chassis member resiliently supported upon a road wheel member by means of an air spring, a source of air under pressure for said air spring, a valve housing mounted within the interior of said air spring adjacent a side wall thereof, said valve housing having inlet and outlet ports opening directly into the interior of said air spring, inlet and outlet fittings mounted in said valve housing and extending through said side wall of said air spring, said valve housing having passage means establishing communication between said inlet fitting and said inlet port and between said outlet fitting and said outlet port, means exteriorly of said air spring connecting said inlet fitting to said air source, said outlet fitting having a port opening directly into the atmosphere exteriorly of said air spring, valve means associated with said valve housing controlling the flow of air through said inlet and outlet ports, and actuating means extending through said side wall of said valve housing and connected interiorly of said air spring to said valve means and exteriorly of said air spring to one of said members.

8. An air suspension unit for a motor vehicle having sprung and unsprung members movable relative to each other, comprising an air spring, a valve housing mounted within said air spring and having an air port opening into the interior of said air spring, a spring biased leveling valve in said housing normally preventing the flow of air through said port, passage means connecting said leveling valve to an air pressure source exteriorly of said air spring and to exhaust exteriorly of said air spring, and an actuating shaft journaled in said valve housing for actuating said valve means, said actuating shaft projecting exteriorly of said air spring and operatively connected to one of said members to be responsive to variations in the relationship between said sprung and unsprung members, and means on said actuating shaft engageable with said leveling valve to operate the latter.

9. In a motor vehicle having a road wheel resiliently supported upon the vehicle frame by means of an air spring and a source of air under pressure for charging said air spring, a leveling valve assembly having a valve housing mounted in fixed position within said air spring, said valve housing having an elongated chamber therein, an actuating shaft extending through said housing and through a side wall of said air spring, linkage connecting the extending portion of said actuating shaft with said road wheel to be responsive to relative movement between said road wheel and said frame, a vane within said fluid chamber and connected to said actuating shaft to be oscillatable therewith, said valve housing having an inlet port on one side thereof opening into said air spring, means connecting said inlet port to said pressure source, said valve housing having an outlet port on the opposite side thereof opening into said air spring, means connecting said outlet port with the exterior of said air spring, a spring urged valve member normally closing each of said ports, and an oscillatable member mounted upon said actuating shaft exteriorly of said valve housing but interiorly of said air spring, said last named member having portions selectively engaged with said valve members to open one of said valve members upon rotation of said actuating shaft in one direction and the other of said valve members upon rotation of said actuating shaft in the opposite direction.

10. The structure defined by claim 9 which is further characterized in that said valve members comprise the opposite leg portions of a U-shaped spring member embracing said valve housing and overlying said inlet and outlet ports, and said valve actuating member is formed with opposed arms engaging the opposed leg portions of said U-shaped member.

11. The structure defined by claim 9 which is further characterized in that said valve housing is a flat generally rectangular body having one flat side secured to the inner side of one wall of the air spring, said inlet and outlet ports being located on the opposite end walls of said housing, said valve members comprising opposed leg portions of a U-shaped spring member having its base secured to said valve housing and its leg portions overlapping said inlet and outlet ports, resilient inserts carried by said leg members and engageable with said inlet and outlet ports respectively, said valve actuating member comprising a plate positioned adjacent the flat side of said valve housing opposite the side secured to the air spring wall, said plate having oppositely extending arm portions engaging the inner sides of the leg portions of said U-shaped member to move one of said resilient inserts from the adjacent port in the valve housing upon rotation of the actuating shaft in one direction and to move the other resilient insert from its adjacent port upon rotation of the actuating shaft in the opposite direction.

References Cited by the Examiner

UNITED STATES PATENTS

| 1,369,946 | 3/21 | Tibbetts | 188—89 |
| 2,670,201 | 2/54 | Rossman | 267—65 |

FOREIGN PATENTS

| 444,540 | 3/36 | Great Britain. |

ARTHUR L. LA POINT, *Primary Examiner.*